(12) United States Patent
Pfeiffer

(10) Patent No.: US 8,613,549 B2
(45) Date of Patent: Dec. 24, 2013

(54) RAIL SECTION THAT FACILITATES RAIL SECTION ALIGNMENT

(75) Inventor: Michael W. Pfeiffer, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 801 days.

(21) Appl. No.: 12/269,541

(22) Filed: Nov. 12, 2008

(65) Prior Publication Data

US 2010/0116624 A1    May 13, 2010

(51) Int. Cl.
*F16C 29/00* (2006.01)

(52) U.S. Cl.
USPC .................................. 384/10; 384/22; 384/45

(58) Field of Classification Search
USPC .............. 384/10, 22, 37, 43, 45, 57; 104/119; 239/10 E
See application file for complete search history.

(56) References Cited

U.S. PATENT DOCUMENTS

| | | |
|---|---|---|
| 4,553,793 A | 11/1985 | Teramachi |
| 4,692,039 A | 9/1987 | Teramachi |
| 5,951,776 A | 9/1999 | Selyutin et al. |
| 6,019,514 A | 2/2000 | Feinstein |
| 6,398,121 B1 * | 6/2002 | Morgan ........................ 238/10 F |
| 6,682,218 B2 | 1/2004 | Ishihara |
| 6,842,961 B2 | 1/2005 | Forlong |
| 7,182,024 B2 * | 2/2007 | Pfeiffer .......................... 104/119 |
| 8,061,627 B2 * | 11/2011 | Norman et al. ............. 238/10 A |

FOREIGN PATENT DOCUMENTS

JP    2006-80260    *    3/2006

OTHER PUBLICATIONS

Cross Roller Slides, downloaded from www.daedalpositioning.com on Mar. 16, 2007, 1 page.

* cited by examiner

*Primary Examiner* — William C Joyce
(74) *Attorney, Agent, or Firm* — Mitchell K. McCarthy; McCarthy Law Group

(57) ABSTRACT

A rail section comprises a body portion. The rail section has a profile that provides one or more roller contact areas extending a length of the rail section. The rail section further comprises an end portion that defines one or more slots that allow the one or more roller contact areas to deflect elastically relative to the body portion.

18 Claims, 5 Drawing Sheets

RAIL SECTION THAT FACILITATES RAIL SECTION ALIGNMENT

BACKGROUND

Many of today's manufacturing procedures involve a conveyor of one sort or another, and in some systems a slide rail consisting of joined rail sections is used for moving work pieces along a manufacturing line. For example, articles may be placed on, or suspended from, carriages that travel along a rail from one work station to another. The carriages may travel continuously or may move and be stopped intermittently. For example, the carriage may be transported along a series of modular work stations, where a different operation is performed on the work piece at each station.

When precision in carriage location on the rail is important, such as in the automated production of relatively small electronic devices, the carriage typically is designed to be held in fairly close contact with the rail. For example, in some slide rail systems the rail has a specific profile allowing it to be embraced by part of the carriage during operation, such that the carriage generally cannot be lifted upward (or titled to the side) while mounted on the rail. This may be helpful in assuring that the carriage can be placed in an exact position for robotic operations on the work piece, to name just one example.

The close fit between carriage and rail may, however, also be associated with disadvantages. It becomes increasingly important that adjacent different rail sections are well aligned. Relatively minimal misalignment can make it difficult or impossible for a carriage to pass over a joint between two rail sections. These difficulties can be troublesome in a manufacturing process involving modular work stations, when it can be difficult to precisely align adjacent work stations so that their respective rail portions can be joined. Such difficulties may arise also in non-conveyor applications, such as a component that travels over joined sections before reversing direction to return over the same sections.

SUMMARY

The present disclosure relates to a rail section that facilitates rail section alignment.

In an embodiment, a rail section comprises a body portion. The rail section has a profile that provides one or more roller contact areas extending a length of the rail section. The rail section further comprises an end portion that defines one or more slots that allow the one or more roller contact areas to deflect elastically relative to the body portion.

These and various other features and advantages will be apparent from a reading of the following detailed description.

DETAILED DESCRIPTION

In general, the present disclosure relates to rail sections that facilitate rail section alignment. The rail sections have profiles that provide one or more roller contact areas that correspond to rollers associated with a carriage. For example, the roller contact areas may be embraced by part of a carriage during operation, such that the carriage generally cannot be lifted upward (or titled to the side) while mounted on the rail. Rollers capable of embracing roller contact areas of a rail section include recirculating ball slide rollers and cross-rollers. In addition, the techniques described herein are useful for any roller type including wheel rollers as well as all ball rollers and cylindrical rollers.

To facilitate rail section alignment, the roller contact areas of a rail section have a degree of flexibility at the ends of the rail section. For example, in some embodiments, the rail section includes slots substantially parallel to a direction of travel of a carriage that separate the roller contact areas of the rail section at the ends of the rail section from the main body portion of the rail section. In other embodiments, a rail section may include a center portion and two end portions comprising an elastically deformable material.

Embodiments facilitate improved connection between rail sections by providing connection of misaligned rail sections, e.g., rail sections of a continuous rail passing through several modular work stations. For example, embodiments may overcome angular, lateral or twisting misalignments. A pair of adjacent rail sections forming a rail section joint may be considered misaligned when respective longitudinal axes of adjacent rail sections are not coextensive to the extent that, were it not for the flexible roller contact areas of the present invention, the roller path spanning two adjacent rail sections would be discontinuous enough to impede smooth movement of a carriage across the joint. Even when a pair of adjacent rail sections forming a rail section joint are substantially aligned when installed, over time and use the rail sections may become substantially misaligned due to normal wear and tear of an assembly line, such as by being bumped, by thermal gradients, etc.

Figure 1A:
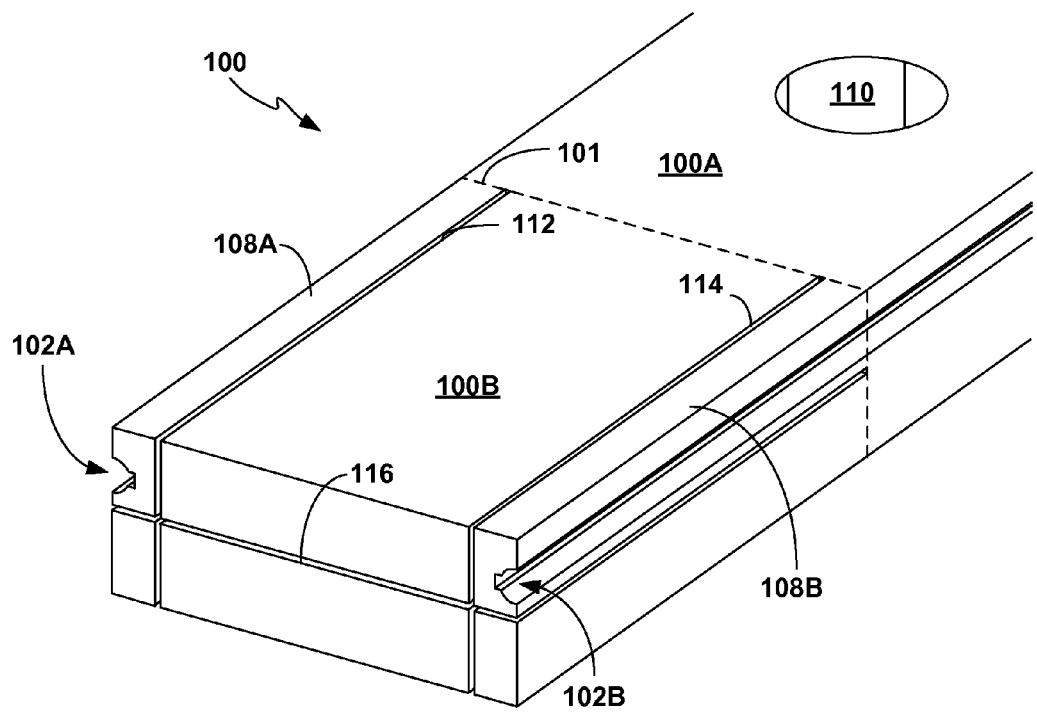
FIGS. 1A-1B illustrate an end of a rail section for a recirculating ball slide carriage. The rail section facilitates rail section alignment via three longitudinal slots.
Figure 1B:
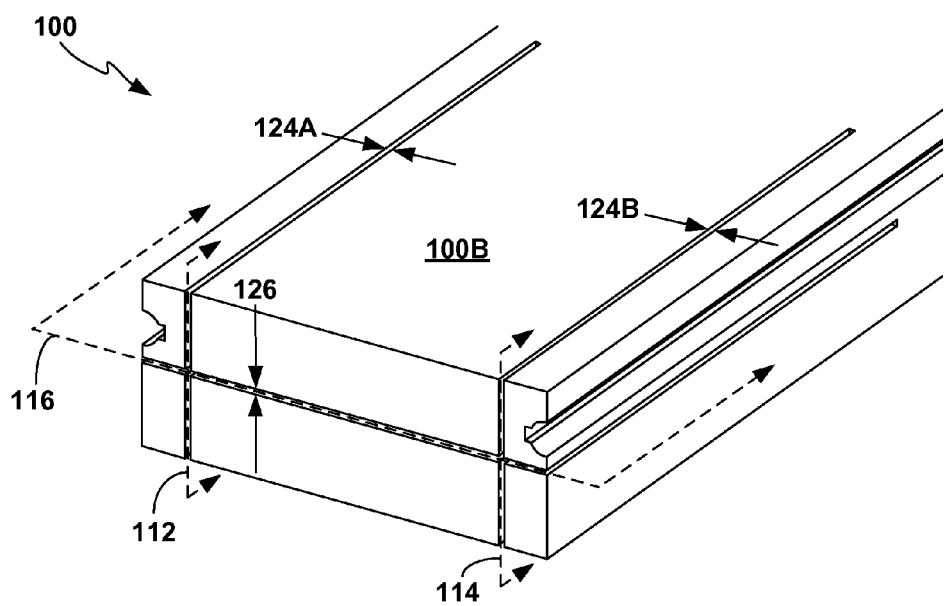

FIGS. 1A-1B illustrate an end of rail section 100 for one or more recirculating ball slide carriages (not shown). A recirculating ball slide carriage includes multiple balls movable in an endless path to provide that the carriage can be transported on rail section 100. Different types of ball slider mechanisms may be used. Rail section 100 has a profile that provides roller contact areas 102A and 102B (roller contact areas 102). Roller contact areas 102 extend the length of rail section 100 and correspond to the ball rollers of the recirculating ball slide carriages.

Rail section 100 includes stiff body portion 100A and end portion 100B. Rail section 100 facilitates rail section alignment to allow a carriage to pass from rail section 100 over end portion 100B onto a rail section adjacent to end portion 100B. Rail section 100 facilitates rail section alignment via three longitudinal slots: horizontal slot 116 and vertical slots 112 and 114. As used throughout this document, the terms horizontal and vertical are not meant to convey an absolute orientation, but are merely used to represent the features as shown in the figures. In addition, horizontal slot 116 and vertical slots 112 and 114 are described as longitudinal because they are each about parallel to a direction of travel of a carriage traversing rail section 100. Horizontal slot 116 and vertical slots 112 and 114 do not need to be precisely parallel to the direction of travel of a carriage traversing rail section 100 to facilitate rail section alignment.

Line 101 represents the transition between stiff body portion 100A and end portion 100B as defined by horizontal slot 116 and vertical slots 112 and 114. Horizontal slot 116 and vertical slots 112 and 114 serve to separate roller contact areas 102 at end portion 100B from the main body portion of rail section 100 to provide flexible roller contact sections 108A and 108B. Roller contact sections 108A and 108B are flexible at end portion 100B due to the deflection allowed by horizontal slot 116 and vertical slots 112 and 114.

Horizontal slot 116 and vertical slots 112 and 114 are designed according to desired flexibility characteristics of roller contact areas 102 at end portion 100B. For example, the stiffness of roller contact areas 102 at end portion 100B depends on the material of rail section 100, the length of horizontal slot 116 and vertical slots 112 and 114, width 126 of horizontal slot 116, widths 124A and 124B of vertical slots 112 and 114 and the placement of horizontal slot 116 and vertical slots 112 and 114. The stiffness of the end portion 100B can be controlled in the selection of these parameters. The placement of horizontal slot 116 and vertical slots 112 and 114 is a significant factor because the stiffness of end portion 100B is greatly dependent on the cross sectional area of the material including roller contact areas 102 separated from the main body portion of rail section 100 by horizontal slot 116 and vertical slots 112 and 114. The stiffness of roller contact areas 102 at end portion 100B also depends on the stiffness of the materials used to form rail section 100.

Generally, width 126 of horizontal slot 116 and widths 124A and 124B of vertical slots 112 and 114 should be less than a radius of the ball rollers of the carriage. The reason that the slot widths should be less than the radius of the rollers is to allow a carriage to transfer even under full deflection of a roller contact area. As an example, width 126 of horizontal slot 116 and widths 124A and 124B of vertical slots 112 and 114 may be between three-fourths and one-tenth of the radius of the ball rollers of the carriage. As another example, width 126 of horizontal slot 116 and widths 124A and 124B of vertical slots 112 and 114 may be between one-half and one-quarter of the radius of the ball rollers of the carriage.

While horizontal slot 116 and vertical slots 112 and 114 are substantially parallel to roller contact areas 102, other slot configurations are also possible. For example, slots that are not parallel to roller contact areas 102 and/or slots with varying widths may also be used. One alternative is rail section 400 shown in FIG. 4, which includes slots that separate roller contact areas without passing through the width or height of rail section 400.

Rail section 100 may be formed by making horizontal cut 116 and vertical cuts 112 and 114 in a solid rail section. Any cutting process may be used to manufacture rail section 100. For example, cutting may include electrical discharge machining, wire electrical discharge machining, plunge electrical discharge machining, cutting using a slitting saw, and/or a different cutting process.

The end (not shown) of rail section 100 opposite end portion 100B generally includes slots equivalent to horizontal slot 116 and vertical slots 112 and 114 such that rail section 100 may facilitate rail section alignment at both ends. However, in other embodiments a rail section may include only a single flexible end portion. The stiff end portion of a rail section may be mated with a flexible end portion of an adjacent rail section such that the joint between the rail sections still facilitates rail section alignment.

Rail section 100 includes through-holes 110 for bolting or screwing the rail section to a mounting surface. For example, through-holes 110 may be counterbores to allow a nut or bolt head to be recessed from the upper surface of rail section 100. Any other suitable technique for mounting rail section 100 may also be used, including, but not limited to, gluing, welding or magnetic fixation.

Rail section 100 may consist of any material suitable for a rail section. Such materials include metals such as an aluminum alloy or stainless steel, a polymer such as Acetal (polyoxymethylene) and composites. Other rail section materials are also possible. In some instances the material of a rail section itself may have some flexibility. As examples, the flexible rail section may be made of a suitable elastomer. One example of such a material is urethane, including polyurethane resin, polyurethane rubber, and combinations thereof. Even in such embodiments, the end portions would still provide added flexibility and would facilitate rail section alignment by limiting resistance of a carriage passing over a substantially misaligned rail section joint.

Figure 2:
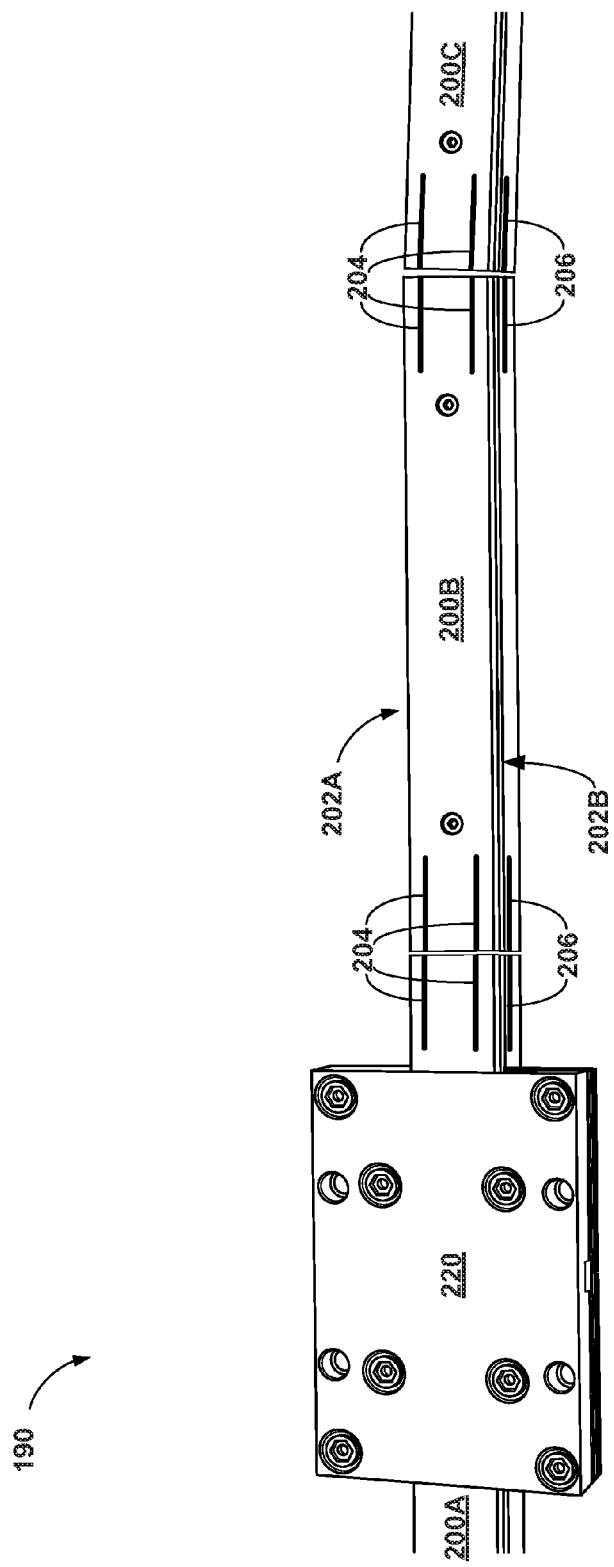
FIG. 2 illustrates a carriage placed on a series of rail sections that facilitate rail section alignment.

FIG. 2 depicts a selected portion of system 190 that may be part of a conveyor application for transporting work pieces on top of carriages during manufacturing. System 190 includes carriage 220 and rail sections 200A-200C (rail sections 200). For clarity, carriage 220 is shown without a workpiece. Rail sections 200 facilitate rail section alignment. For example, each of rail sections 200 may be equivalent to rail section 100 (FIG. 1), and carriage 220 may be a recirculating ball slide carriage, a cross-roller carriage or other roller carriage.

Rail sections 200 are located in an end-to-end configuration such that carriage 200 can pass from one rail section to the next. Rail sections 200 each include roller contact areas 202A and 202B (roller contact areas 202). The end portions of each of rail sections 200 include longitudinal horizontal slots 206 and vertical slots 204. Horizontal slots 206 and vertical slots 204 provide flexibility to roller contact areas 202 at the mating interfaces of rail sections 200. This allows carriage 220 to pass over a substantially misaligned rail section joint, e.g., the joint between rail section 200B and 200C is shown in FIG. 2 as being substantially misaligned.

Figure 3:
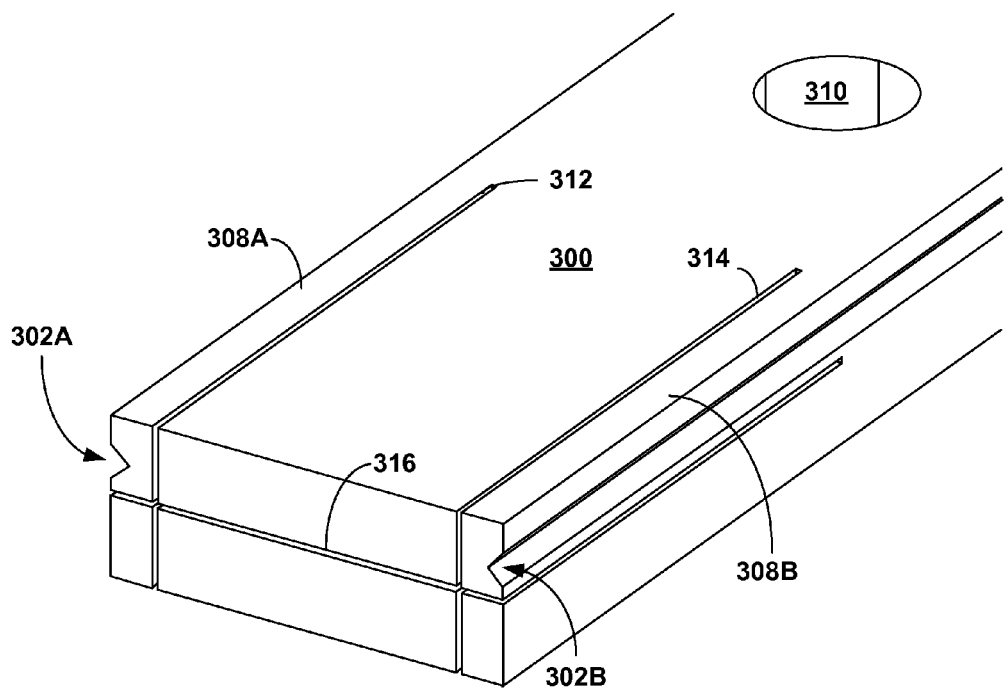
FIG. 3 illustrates an end of a rail section for a cross-roller carriage. The rail section facilitates rail section alignment via three longitudinal slots.

FIG. 3 illustrates an end of rail section 300, which is configured for a cross-roller carriage. Rail section 300 is similar to rail section 100 (FIG. 1) except that rail section 300 is configured for a cross-roller carriage instead of a recirculating ball slide carriage. For brevity, features described with respect to rail section 100 similar to features of rail section 300 may be described in limited detail with respect to rail section 300 or, in some instances, not at all.

Rail section 300 has a profile that provides roller contact areas 302A and 302B (roller contact areas 302). Roller contact areas 302 extend the length of rail section 300 and correspond to the rollers of the cross-roller carriages. Rail section 300 facilitates rail section alignment to allow a carriage to pass from rail section 300 onto an adjacent rail section. Rail section 300 facilitates rail section alignment via three longitudinal slots: horizontal slot 316 and vertical slots 312 and 314. Horizontal slot 316 and vertical slots 312 and 314 serve to separate roller contact areas 302 from the main body portion of rail section 300 to provide roller contact sections 308A and 308B at the end of rail section 300. Roller contact sections 308A and 308B are flexible at the end of rail section 300 due to the deflection allowed by horizontal slot 316 and vertical slots 312 and 314.

As described with respect to rail section 100, horizontal slot 316 and vertical slots 312 and 314 are designed according to desired flexibility characteristics of roller contact areas 302. Generally, the width of horizontal slot 316 and widths of vertical slots 312 should be less than a radius of the rollers of the carriage. As an example, the widths may be between three-fourths and one-tenth of the radius of the rollers of the carriage. As another example, the widths may be between one-half and one-quarter of the radius of the rollers of the carriage.

While horizontal slot 316 and vertical slots 312 and 314 are substantially parallel to roller contact areas 302, other slot configurations are also possible. For example, slots that are not parallel to roller contact areas 302 and/or slots with varying widths may also be used.

Rail section 300 includes through-holes 310 for bolting or screwing the rail section to a mounting surface. For example, through-holes 310 may be counterbores to allow a nut or bolt head to be recessed from the upper surface of rail section 300. Any suitable technique for mounting rail section 300 may also be used, including, but not limited to, gluing, welding or magnetic fixation.

Rail section 300 may be formed by making horizontal cut 316 and vertical cuts 312 and 314 in a solid rail section. Any cutting process may be used to manufacture rail section 300. For example, cutting may include electrical discharge machining, wire electrical discharge machining, plunge electrical discharge machining, cutting using a slitting saw, and/or a different cutting process.

Rail section 300 may consist of any material suitable for a rail section. Such materials include metals such as an aluminum alloy or stainless steel, a polymer such as Acetal (polyoxymethylene) and composites. Other rail section materials are also possible. In some instances the material of a rail section itself may have some flexibility. As examples, the flexible rail section may be made of a suitable elastomer. One example of such a material is urethane, including polyurethane resin, polyurethane rubber, and combinations thereof. Even in such embodiments, rail section 300 would still provide added flexibility and would limit resistance of a cross-roller carriage passing over a substantially misaligned rail section joint including the end of rail section 300.

Figure 4:
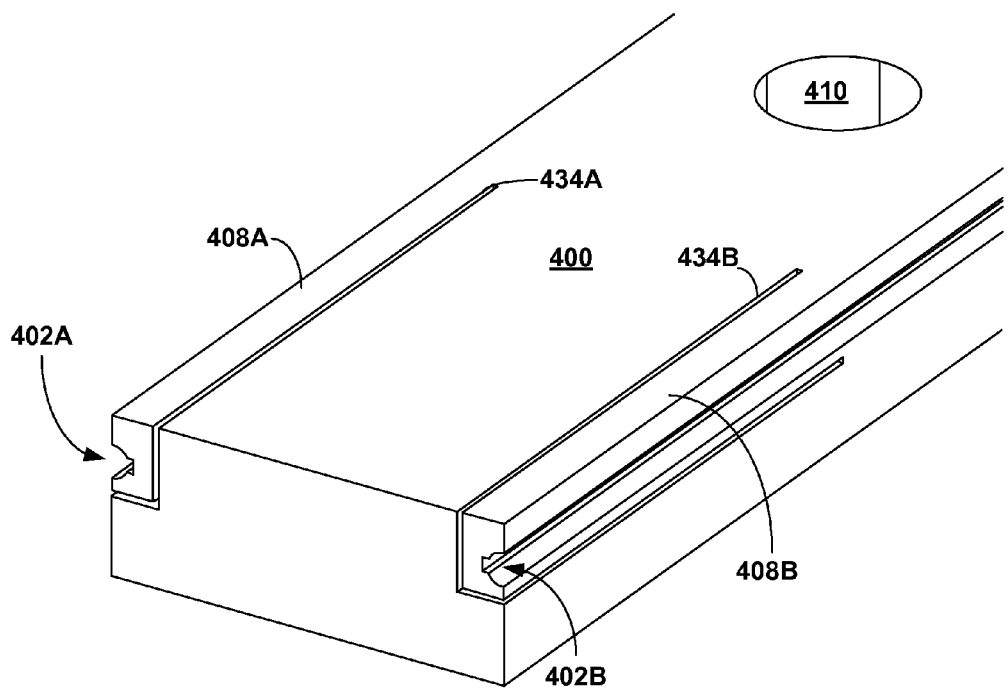
FIG. 4 illustrates an end of a rail section including longitudinal slots having a different configuration than the longitudinal slots of the rail sections of FIGS. 1 and 3.

FIG. 4 illustrates an end of rail section 400, which includes longitudinal slots 434A and 434B (longitudinal slots 434). Longitudinal slots 434 have a different configuration than the longitudinal slots of the rail sections of FIGS. 1 and 3. Specifically, longitudinal slots 434 separate roller contact areas 402A and 402B from the main body portion of rail section 400 without passing through the width or height of rail section 400. For brevity, features described with respect to rail section 100 similar to features of rail section 400 may be described in limited detail with respect to rail section 400 or, in some instances, not at all.

Rail section 400 has a profile that provides roller contact areas 402A and 402B (roller contact areas 402). Roller contact areas 402 extend the length of rail section 400 and correspond to the rollers of recirculating ball slide carriages. Rail section 400 facilitates rail section alignment via longitudinal slots 434, which serve to separate roller contact sections 408A and 408B from the main body portion of rail section 400 to provide flexibility at the end of rail section 400.

As described with respect to rail section 100, longitudinal slots 434 are designed according to desired flexibility characteristics of roller contact areas 402. Generally, the widths longitudinal slots 434 should be less than a radius of the ball rollers of the carriage. As an example, the widths may be between three-fourths and one-tenth of the radius of the ball rollers of the carriage. As another example, the widths may be between one-half and one-quarter of the radius of the ball rollers of the carriage.

While longitudinal slots 434 are substantially parallel to roller contact areas 402, other slot configurations are also possible. For example, slots that are not parallel to roller contact areas 402 and/or slots with varying widths may also be used.

Rail section 400 includes through-holes 410 for bolting or screwing the rail section to a mounting surface. For example, through-holes 410 may be counterbores to allow a nut or bolt head to be recessed from the upper surface of rail section 400. Any suitable technique for mounting rail section 400 may also be used, including, but not limited to, gluing, welding or magnetic fixation.

Rail section 400 may be formed by making horizontal and vertical cuts for each of longitudinal slots 434 in a solid rail section. Any cutting process may be used to manufacture rail section 400. For example, cutting may include electrical discharge machining, wire electrical discharge machining, plunge electrical discharge machining, cutting using a slitting saw, and/or a different cutting process.

Rail section 400 may consist of any material suitable for a rail section. Such materials include metals such as an aluminum alloy or stainless steel, a polymer such as Acetal (polyoxymethylene) and composites. Other rail section materials are also possible. In some instances the material of a rail section itself may have some flexibility. As examples, the flexible rail section may be made of a suitable elastomer. One example of such a material is urethane, including polyurethane resin, polyurethane rubber, and combinations thereof. Even in such embodiments, rail section 400 would still provide added flexibility and would limit resistance of a recirculating ball slide carriage passing over a substantially misaligned rail section joint including the end of rail section 400.

Figure 5:
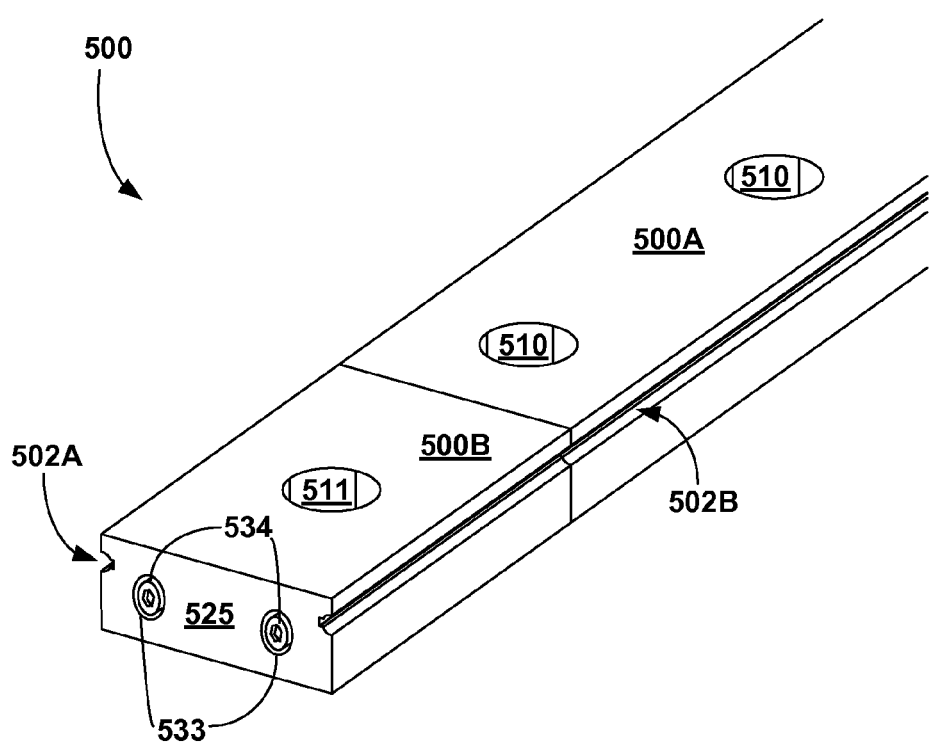
FIG. 5 illustrates an end of a rail section for a recirculating ball slide carriage. The rail section facilitates rail section alignment via a flexible end portion.

FIG. 5 illustrates an end of rail section 500 for a recirculating ball slide carriage. Rail section 500 facilitates rail section alignment via flexible end portion. Rail section 500 has a profile that provides roller contact areas 502A and 502B (roller contact areas 502). Roller contact areas 502 extend the length of rail section 500 and correspond to the ball rollers of the recirculating ball slide carriages.

Rail section 500 includes stiff body portion 500A and end portion 500B. Rail section 500 facilitates rail section alignment to allow a carriage to pass from rail section 500 over end portion 500B onto a substantially misaligned rail section adjacent to end portion 500B. End portion 500B comprises an elastically deformable material that is more flexible than stiff body portion 500A to allow deflection of roller contact areas 502.

As examples, end portion 500B may be made of a suitable elastomer. One example of such a material is urethane, including polyurethane resin, polyurethane rubber, and combinations thereof. Body portion 500A may consist of any material suitable for a rail section. Such materials include metals such as an aluminum alloy or stainless steel, a polymer such as Acetal (polyoxymethylene) and composites. Other materials may also be used.

End portion 500B includes through-holes 533 for screwing end portion 500B to body portion 500A with hex-head screws 534. Through-holes 533 are counterbores to allow hex-head screws 534 to be recessed from the front surface of end portion 500B in order to allow rail section 500 to abut with an adjacent rail section. Any other suitable technique for attaching end portion 500B to body portion 500A may also be used, including, but not limited to gluing or snap-fitting end portion 500B to body portion 500A.

Rail section 500 includes through-holes 510 and 511 for bolting or screwing the rail section to a mounting surface. For example, through-holes 510 and 511 may be counterbores to allow a nut or bolt head to be recessed from the upper surface of rail section 500. Any suitable technique for mounting rail section 500 may also be used, including, but not limited to, gluing, welding or magnetic fixation.

Figure 6:
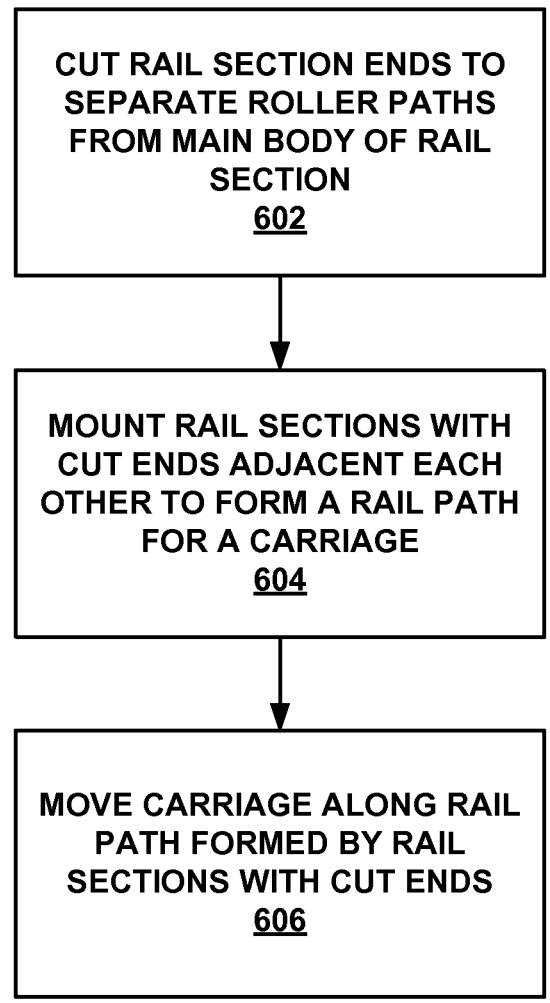
FIG. 6 illustrates exemplary techniques for modifying a solid rail section to provide a rail section that facilitates rail section alignment.

FIG. 6 illustrates exemplary techniques for modifying a solid rail section to allow the solid rail section to facilitate rail section alignment.

First, a substantially stiff rail section having a profile that provides one or more roller contact areas extending a length of the rail section is cut along the length of the rail section. The cuts make slots that separate the one or more roller contact areas from a main body portion at least one end of the rail section to allow the one or more roller contact areas to deflect elastically at the end of the rail section (602). As examples, the cutting may include one or more of electrical discharge machining, wire electrical discharge machining, plunge electrical discharge machining; and cutting using a slitting saw. Step 602 may be repeated for each end in a set of rail sections.

Next, rail sections with cut ends are placed in an end-to-end configuration to form a rail path of a carriage (604). Then the carriage is rolled over the rail path formed by the series of rail sections (606). Step 606 may be performed even if the rail sections are imprecisely aligned as the cut ends of the rail sections allows the carriage to pass over a substantially misaligned rail section joint.

A number of exemplary implementations have been described. Nevertheless, it will be understood that various modifications may be made without departing from the spirit and scope of this disclosure. For example, implementations were described with respect to rail sections configured for recirculating ball slide carriages and cross-roller carriages, but other roller configurations may also be used. Accordingly, the implementations described above and other implementations are within the scope of the following claims.

The invention claimed is:

1. A rail capable of selectively conveying an object, the rail comprising:
a longitudinally-extending stiff body having a first portion of a longitudinal bearing surface constructed of a first material rigidly supporting in contacting engagement against a bearing member of the object while the object traverses the first portion of the longitudinal bearing surface; and
a longitudinally-extending flexible body defining an end of the rail and having a different second portion of the longitudinal bearing surface likewise constructed of the first material but flexibly supporting in contacting engagement against the object's bearing member while the object traverses the second portion of the longitudinal bearing surface.

2. The rail of claim 1 wherein the flexible body is a first flexible body, comprising a longitudinally-extending second flexible body different than the first flexible body having a different third portion of the longitudinal bearing surface likewise constructed of the first material but flexibly supporting in contacting engagement against the object's bearing member while the object traverses the third portion of the longitudinal bearing surface.

3. The rail of claim 2 wherein the first flexible body and the second flexible body define opposing ends of the rail.

4. The rail of claim 2 wherein the longitudinal bearing surface is a first longitudinal bearing surface and the first flexible body supports a second longitudinal bearing surface opposing the first longitudinal bearing surface.

5. The rail of claim 4 wherein the second flexible body third portion supports the opposing first and second longitudinal bearing surfaces.

6. The rail of claim 1 wherein the flexible body comprises a compressible feature.

7. The rail of claim 6 wherein the compressible feature defines an opening in the flexible body.

8. The rail of claim 6 wherein the compressible feature defines a longitudinally-extending slot.

9. The rail of claim 8 wherein the longitudinal bearing surface is sized to receivingly engage the object's bearing member in a close mating relationship.

10. The rail of claim 9 wherein the object's bearing member is a roller member defining a radius of construction, and wherein the slot is of a compressible width that is less than the roller member's radius.

11. The rail of claim 1 wherein the stiff body defines an aperture sized to admit a fastener that operably affixes the rail to a supporting structure.

12. The rail of claim 1 wherein the first material is selected from the group consisting of aluminum, steel, a polymer, and a composite.

13. The rail of claim 1 wherein the longitudinal bearing surface of the first portion and the second portion are non-segmented.

14. A method comprising:
obtaining a rail including a longitudinally-extending stiff body having a rigidly supported portion of a longitudinal bearing surface constructed of a first material, and a longitudinally-extending flexible body defining an end of the rail and having a flexibly supported portion of the longitudinal bearing surface likewise constructed of the first material;
supporting a bearing member of an object via contacting engagement against the rigidly supported portion of the longitudinal bearing surface while the object traverses the stiff body; and
supporting the object's bearing member via contacting engagement against the flexibly supported portion of on the longitudinal bearing surface while the object traverses the flexible body.

15. A rail capable of selectively conveying an object, the rail comprising:
a longitudinally-extending stiff body having a first portion of a longitudinal bearing surface rigidly supporting in contacting engagement against a bearing member of the object while the object traverses the first portion of the longitudinal bearing surface; and
a longitudinally-extending flexible body having a different second portion of the longitudinal bearing surface flexibly supporting in contacting engagement against the object's bearing member while the object traverses the second portion of the longitudinal bearing surface, the flexible body defining two longitudinal slots that intersect each other and that are operably compressed, by a force from the bearing member against the second portion of the longitudinal bearing surface, permitting the second portion of the longitudinal bearing surface to be substantially laterally deflectable in relation to the first portion of the longitudinal bearing surface.

16. The rail of claim 15 wherein the two longitudinal slots intersect substantially orthogonal to each other.

17. The rail of claim 15 wherein the two longitudinal slots intersect at respective edges of the slots.

18. A rail capable of selectively conveying an object, the rail comprising:

a longitudinally-extending stiff body having a first portion of a continuous and non-segmented longitudinal bearing surface rigidly supporting in contacting engagement against a bearing member of the object while the object traverses the first portion of the non-segmented longitudinal bearing surface; and a longitudinally-extending flexible body having a different second portion of the non-segmented longitudinal bearing surface flexibly supporting in contacting engagement against the object's bearing member while the object traverses the second portion of the non-segmented longitudinal bearing surface, the first portion and the second portion constructed of the same material.

* * * * *